United States Patent [19]

Fortini

[11] 4,367,929
[45] Jan. 11, 1983

[54] FRAME FOR EYEGLASSES WITH INCLINABLE LENSES

[76] Inventor: Umberto Fortini, Via F. Caracciolo 18, Florence, Italy

[21] Appl. No.: 151,837

[22] Filed: May 21, 1980

[30] Foreign Application Priority Data

May 25, 1979 [IT] Italy .............................. 11669/79[U]

[51] Int. Cl.$^3$ .......................... G02C 5/14; G02C 5/08
[52] U.S. Cl. ..................................... 351/119; 351/63
[58] Field of Search .......................... 351/63, 119, 118

[56] References Cited

U.S. PATENT DOCUMENTS 2,307,419  1/1943  McNeill et al. ............... 351/63 UX
3,907,410  9/1975  Richmond et al. ................. 351/119

Primary Examiner—John K. Corbin
Assistant Examiner—Rodney Bovernick
Attorney, Agent, or Firm—Hopgood, Calimafde, Kalil, Blaustein & Judlowe

[57] ABSTRACT

At the ends of the front part (1) for the lenses, two principal articulations (3) with parallel axes engage two arms (7, 9) adapted to be swung back against the front part (1) and lifted from it for use on the ears. Each arm (7, 9) has a transverse articulation (10) along a transverse axis with respect to the head and common to the two arms, with the frame mounted on the face, so as to permit angulation between the parts (7, 9) of the arm and therefore inclination of the front part (1) and of the lenses along said transverse axis; the two component parts (7, 9) of the two transverse articulations (10) are frictionally connected to each other so as to maintain the inclination imposed on them and thus on the front part. The front part (1) can be folded at the center (at 5).

4 Claims, 13 Drawing Figures

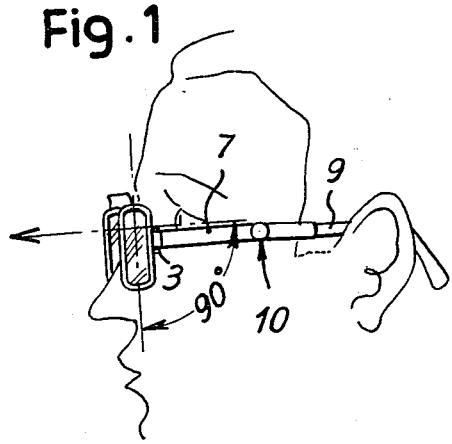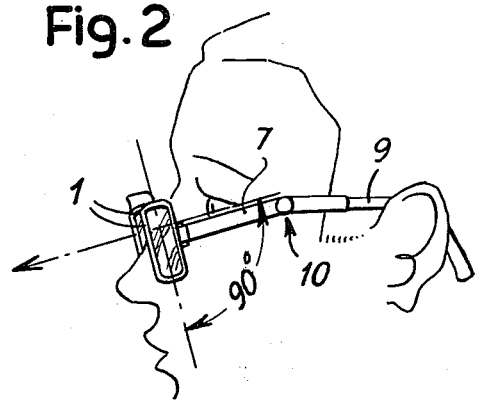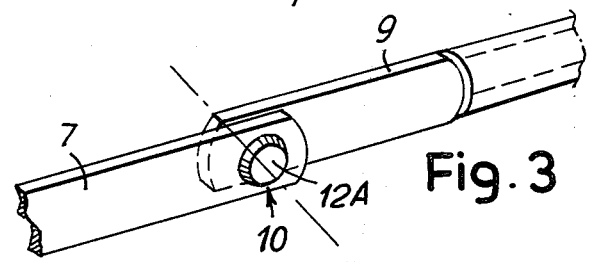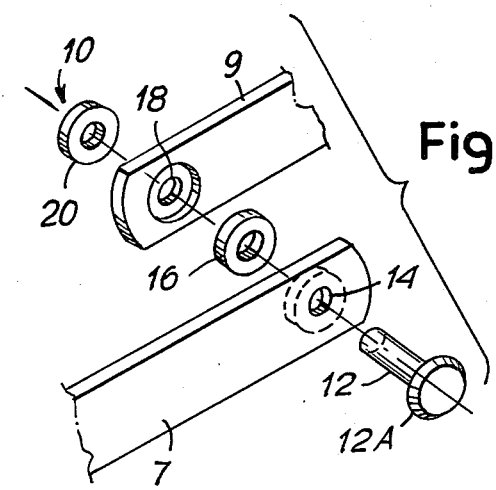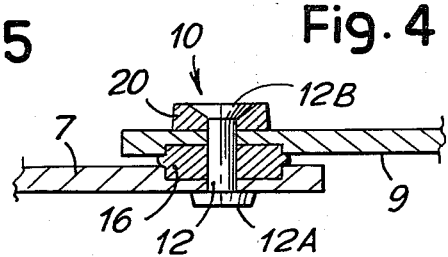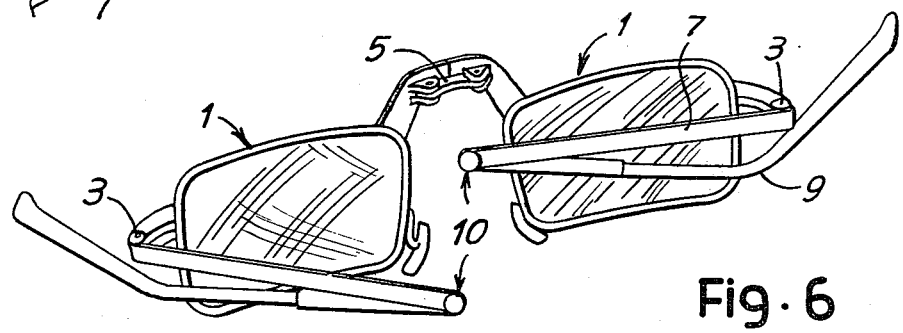

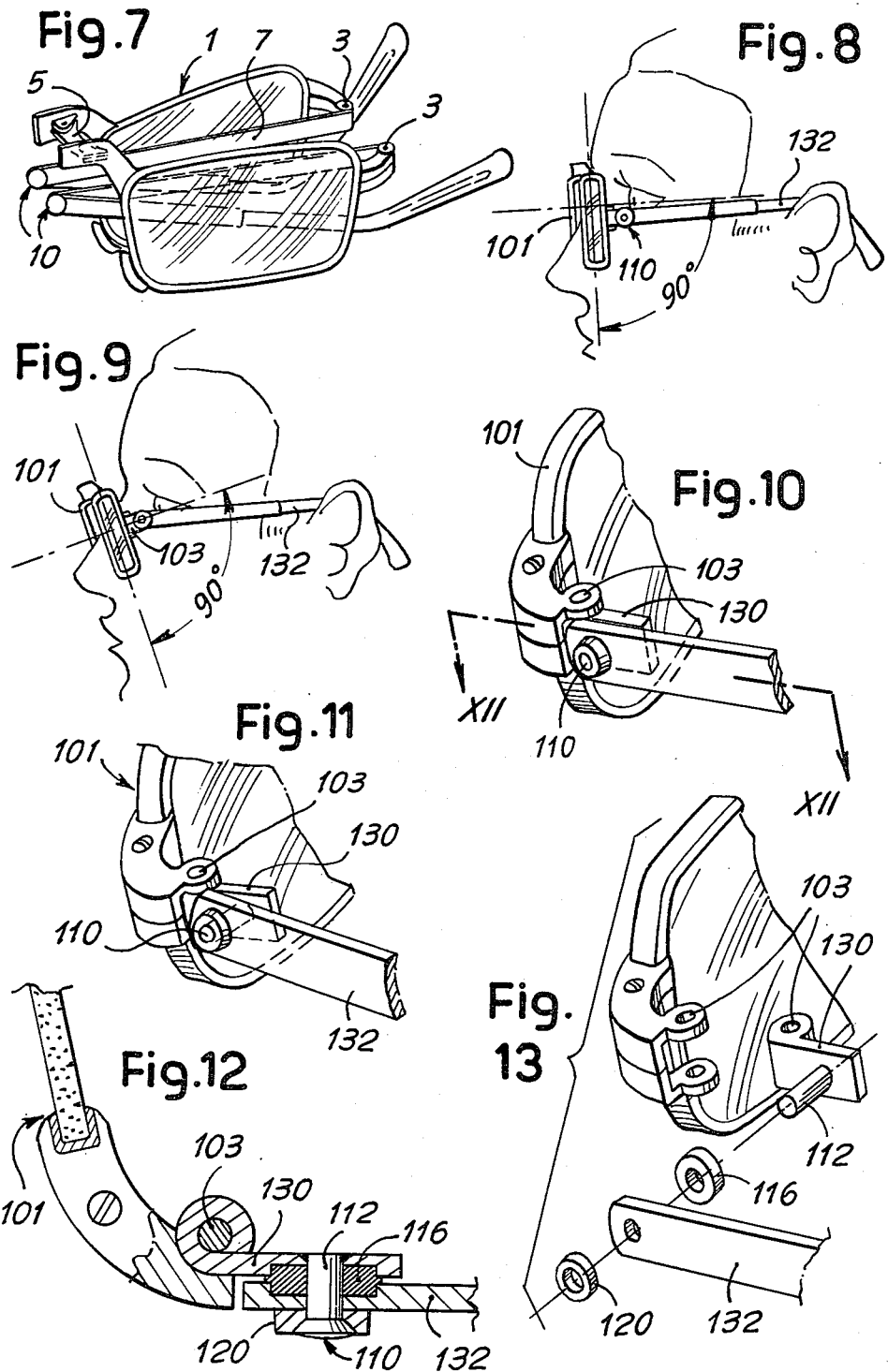

FRAME FOR EYEGLASSES WITH INCLINABLE LENSES

The object of the present invention is a frame for eyeglasses comprising a front part for the lenses to the ends of which there are articulated by two principal articulations, two parallel arms adapted to be swung back onto the front part and raised up from it for use on the ears.

The object of the invention is to permit a better positioning of the lenses with respect to the direction of the optical axis of the eye, under the various conditions in which the eyeglasses can be used, as compared with what can be obtained with traditional frames of the aforementioned type.

In accordance with the invention and for the purpose indicated, each of the arms has a transverse articulation along an axis transverse to the head and common to the two arms when the frame is in position for use, so as to permit an inclination of the front part, and therefore of the lenses along said transverse axis; the component parts of each of the two transverse articulations are frictionally attached to each other so as to maintain the inclination established between them and accordingly to the front part.

In accordance with one embodiment, the transverse articulations can be arranged closely adjacent to the principal articulations of the arms to the front part. In accordance with another embodiment, the transverse articulations are disposed in an intermediate position of the length of the arms; each of the arms is then divided into two parts by the corresponding transverse articulation. In this further embodiment, the front part can be made of two parts articulated in an intermediate position substantially corresponding to the nose support bridge; therefore the entire frame can be folded into a relatively short space.

The articulations have a discoidal thickening of an elastically compressible material and as articulation pin there is provided a rivet pin which produces axial compression. In this way the friction between the two parts constituting the articulations is assured for a long time.

The accompanying drawing shows non-limitative examples of embodiments of the invention. In the drawing:

FIGS. 1 and 2 show two methods of use of a frame, with different inclination of the direction of the eyes;

FIGS. 3, 4 and 5 show in perspective view, in cross section and in exploded perspective view a transverse articulation in the intermediate position of each arm;

FIGS. 6 and 7 show in perspective the eyeglass frame partially folded and completely folded respectively;

FIGS. 8 and 9 show a variant embodiment in a manner similar to FIGS. 1 and 2;

FIGS. 10 and 11 show in perspective a double articulation of an arm on the front part;

FIG. 12 shows a cross section along the line XII—XII of FIG. 11, and

FIG. 13 shows an exploded perspective view of the parts of the double articulation.

In FIGS. 1 to 7, there is generally indicated by 1 the front part of an eyeglass frame to which by main articulations 3 having approximately parallel axes there are mounted the two arms for use on the ears. The front part 1 is made of two substantially symmetrical parts which are articulated to each other by a bridge piece 5; in this way the front part can be folded from the position shown in FIG. 6 into the position shown in FIG. 7, with the two lenses substantially behind each other; this is made possible by the fact that the arms are developed in the manner hereinbelow indicated.

Each of the two arms for use on the ears consists of two contiguous arm parts 7 and 9, said two arm parts 7 and 9 being articulated at 10 along a transverse axis of articulation in a position which is therefore intermediate with respect to the total length of the arm formed by the two parts 7 and 9. When the eyeglasses are worn, the two articulations 10 arrange themselves approximately along a common transverse axis of articulation.

Each articulation 10 is made with a pin 12 having a head 12A which passes through a hole 14 in the arm part 7, a hole in a friction ring 16, a hole 18 in the arm part 9 and a central hole of a concave washer 20 in which the end of the pin 12 is bulged to form a second retaining and pressure head 12B. By this arrangement, the two arm parts 7 and 8 can be inclined with respect to each other with a certain friction and held by friction in the position imposed on them at the time. The friction ring 16 consists of a material such as to assure a long life of the friction articulation so as to obtain the possibility of inclining the two arm parts 7 and 9 with respect to each other.

With this arrangement there is obtained the possibility of inclining the front part of the eyeglass frame and therefore the lenses with respect to the face in such a manner that the axes of the lenses can be adapted at least approximately to the axes of the respective eyes, depending on the use temporarily contemplated for the eyeglasses. There is therefore obtained a satisfactory adaptation with respect to the correct use of the eyeglasses and a position of the lens which is as aligned as possible with the axis of the eye.

The articulations 10 also make it possible to fold back the front part 1 as shown in FIG. 7 and to fold the parts 7 and 9 of each arm approximately against each other around the respective articulation 10.

In the embodiment shown in FIGS. 8 to 13, the parts corresponding to those of the preceding example are indicated by the same reference numbers increased by 100. The front part 101, which in this case is not centrally articulated, has principal articulations 103 with approximately parallel axes for the arms which engage on the ears. On the pins defining the principal articulations 103 there are engaged connecting elements 130, each of which forms a transverse articulation 110 for an arm 132, which in the present embodiment is a single piece. To the connecting element 130 there is engaged a pin 112 for the transverse articulation 110; this pin 112 passes through a friction ring 116 which is interposed between the arm 132 and the part 130, the arm 132 and a washer 120, which serves for the riveting of the pin 112.

In this case also, as a result of the common transverse articulation 110 it is possible to incline the front part 101 with respect to the face, as is clear by comparing FIGS. 8 and 9, so as to cause the axis of the eye to coincide at least approximately with the axis of the lens, under the conditions of normal use.

In both cases, the user can easily incline the front part to a greater or lesser extent with respect to his face, even with substantial frequency, in view of the ease with which the front part can be inclined with respect to the arms 132 and to the arm parts 9 respectively. The development of the transverse articulations with the friction rings—which may consist of synthetic resin of so-called nylon or equivalent type—assures long life for the transverse frictional articulations with substantial constancy of the moment of friction, the mounting being effected with a certain axial compression.

It will be understood that the drawing merely shows one illustrative embodiment, given merely as a practical demonstration of the invention, and it may be varied in its forms and arrangements without thereby going beyond the scope of the present inventive concept.

What is claimed is:

1. A frame for eyeglasses comprising a front part for the lenses to the ends of which there are articulated, along two principal articulations parallel to each other, two arms adapted to be swung against the front part and to be raised from same for use on the ears, characterized by the fact that each of the arms has a transverse articulation along a geometric axis transverse to the head and common to the two arms when the frame is mounted on the face in order to permit an inclination of the front part and therefore of the lenses along said transverse axis; the transverse articulations having a disc of relatively elastic material disposed between the portions of the two arms and pin means pivotally joining the portions of the arms and compressing said disc to hold the portions of the arms frictionally together in order to maintain the inclination imposed between them and thus on the front part.

2. A frame according to claim 1, characterized by the fact that the transverse articulations are arranged closely adjacent to the main articulations of the arms to the front part.

3. A frame according to claim 1, characterized by the fact that the transverse articulations are arranged in intermediate position of the length of the arms, each of said arms being divided into two parts by the respective transverse articulation.

4. A frame according to claim 1, characterized by the fact that the front part consists of two parts articulated at an intermediate position, substantially at a place in correspondence with the nose support bridge, so that the entire frame can be folded into a relatively very small space.

* * * * *